US005613039A

United States Patent [19]
Wang et al.

[11] Patent Number: 5,613,039
[45] Date of Patent: *Mar. 18, 1997

[54] APPARATUS AND METHOD FOR MOTION DETECTION AND TRACKING OF OBJECTS IN A REGION FOR COLLISION AVOIDANCE UTILIZING A REAL-TIME ADAPTIVE PROBABILISTIC NEURAL NETWORK

[75] Inventors: C. David Wang, Melville; James P. Thompson, Greenlawn, both of N.Y.

[73] Assignee: AIL Systems, Inc., Deer Park, N.Y.

[*] Notice: The portion of the term of this patent subsequent to Jan. 4, 2011, has been disclaimed.

[21] Appl. No.: 177,359

[22] Filed: Jan. 3, 1994

Related U.S. Application Data

[63] Continuation-in-part of Ser. No. 648,194, Jan. 31, 1991, Pat. No. 5,276,772.

[51] Int. Cl.$^6$ ............................. G06F 15/18; G01S 13/00
[52] U.S. Cl. ................................. 395/22; 395/24; 395/11; 342/70
[58] Field of Search .............................. 342/28, 70, 90, 342/95, 118, 129, 195, 196, 71; 395/22, 21, 27, 11, 24; 364/516, 517; 340/436

[56] References Cited

U.S. PATENT DOCUMENTS

| | | | |
|---|---|---|---|
| 3,646,588 | 2/1972 | Van Popta | 342/197 |
| 3,653,042 | 3/1972 | Molho | 342/197 |
| 4,760,604 | 7/1988 | Cooper et al. | 395/21 |
| 4,851,854 | 7/1989 | Drogin | 364/423 |
| 5,087,918 | 2/1992 | May et al. | 342/85 |
| 5,167,006 | 11/1992 | Furuta et al. | 395/27 |
| 5,175,798 | 12/1992 | Taylor et al. | 395/27 |
| 5,216,750 | 6/1993 | Smith | 395/22 |

(List continued on next page.)

OTHER PUBLICATIONS

"An Optical Fourier/Electronic Neurocomputer Automated Inspection System", by D.E. Glover, *IEEE International Conference on Neural Networks*, pp. I–569 to I–576 (Jul. 1988).

"A VLSI Implementation of a Neural Car Collision Avoidance Controller", by Nijhuis, et al., *IEEE International Joint Conference on Neural Networks*, pp. I–493 to I–499 (Jul. 1991).

"An Adaptive Data Sorter Based on Probabilistic Neural Networks", by Wang, et al., *IEEE International Conference on Neural Networks*, pp. 1296 through 1302 (Nov. 1991).

"Minimum Description Length Pruning and Maximum Mutual Information Training of Adaptive Probabilistic Neural Networks", by Fakhr, et al., *IEEE International Conference on Neural Networks*, pp. 1338 through 1342 (Apr. 1993).

(List continued on next page.)

Primary Examiner—Robert W. Downs
Attorney, Agent, or Firm—Hoffmann & Baron

[57] ABSTRACT

Apparatus for motion detection and tracking of objects in a region for collision avoidance includes a signal transmitter which provides first and second detection signals for at least partial reflection by an object located in a spatial region. The apparatus further includes a signal receiver for receiving the deflected first and second detection signals corresponding to first and second object parameter data signals. The apparatus further includes a Fourier transform circuit for receiving the first and second object parameter data signals and providing first and second Fourier transform object parameter data signals. The apparatus further includes a probabilistic neural network for receiving and sorting the first and second Fourier transform object parameter data signals without the use of a priori training data.

20 Claims, 10 Drawing Sheets

U.S. PATENT DOCUMENTS

| | | | |
|---|---|---|---|
| 5,233,354 | 8/1993 | Roth et al. | 395/22 |
| 5,235,339 | 8/1993 | Morrison et al. | 395/22 |
| 5,268,692 | 12/1993 | Grosch et al. | 342/70 |
| 5,270,720 | 12/1993 | Stove | 342/174 |
| 5,302,956 | 4/1994 | Asbury et al. | 342/70 |
| 5,345,539 | 9/1994 | Webb | 395/22 |
| 5,381,153 | 1/1995 | Saito et al. | 342/70 |

OTHER PUBLICATIONS

"Probabalistic Neural Networks for Classification, Mapping, or Associative Memory", by Donald F. Specht, *IEEE International Conference on Neural Networks*, vol. 1, pp. 525–532 (Jul. 1988).

"The Use of Probabilistic Neural Networks to Improve Solution Times for Hull–to–Emitter Correlation Problems", by P. Susie Maloney and Donald F. Specht, published by the *International Joint Conference on Neural Networks*, vol. 1, pp. 289–294 (Jun. 1989).

"An Application of Neural Net Technology to Surveillance Information Correlation and Battle Outcome Prediction" by P. Susie Maloney, published by the IEEE pp. 948–955 (1989).

"Probabalistic Neural Networks and the Polynomial Adaline as Complementary Techniques for Classification" by Donald F. Specht, Published in *IEEE Transactions of Neural Networks*, vol. 1, No. 1, pp. 111–121 (Mar.

"Survey of Neural Network Technology for Automatic Target Recognition" By Michael W. Roth, published in *IEEE Transactions of Neural Networks,* vol. 1, No. 1, pp. 28–43 (Mar. 1990).

Wang et al., "An Adaptive Data Sorter Based on Probabilistic Neural Networks," 1991 Conf.: National Aerospace and Electronics, May 1991, 1096–1102.

Xu et al., "Optimum Frequencies Selection for Radar Target Classification by Neural Network," IEEE Int'l. Conf. Neural Networks, Nov. 1991, 1236–1241.

Steen et al., "The Application of Feed–Forward Connectionist Models to ESM Bearing Estimation Using Signal Amplitude," IEE Colloq. Signal Processing Techniques for Electronic Warfare, Jan. 1992, 4/1–4/6.

Kim et al., "Generalized Probabilistic Neural Network Based Classifiers," IEEE Int'l. Conf. Neural Networks, Jun. 1992, III–648–653.

Kim et al, "Neural Network Based Optimum Radar Target Detection in Non–Gaussian Noise," IEEE Int'l. Conf. Neural Networks, Jun. 1992, III–654–659.

APPARATUS AND METHOD FOR MOTION DETECTION AND TRACKING OF OBJECTS IN A REGION FOR COLLISION AVOIDANCE UTILIZING A REAL-TIME ADAPTIVE PROBABILISTIC NEURAL NETWORK

CROSS REFERENCE TO RELATED APPLICATION

This application is a continuation-in-part of U.S. patent application Ser. No. 07/648,194 filed Jan. 31, 1991, now U.S. Pat. No. 5,276,772, the disclosure of which is incorporated herein by reference.

BACKGROUND OF THE INVENTION

1. Field of the Invention

This invention relates to probabilistic neural networks, and more particularly relates to an adaptive probabilistic neural network that can sort input parameter data signal description words, relating to the relative motion of objects, without the use of a priori training data.

2. Description of the Prior Art

Radar emitter pulse sorting and radar emitter identification are the primary functions of electronic support measure (ESM) and electronic counter measure (ECM) systems. There are three basic steps involved in the emitter identification process. First, the input pulse signals undergo an initial level of analysis and differentiation commonly referred to as "sorting" or "pulse-by-pulse deinterleaving". The sorting process involves analysis of the input signals to achieve an initial grouping of pulses from each emitter in the collected pulse sequence. If a high percentage of pulses are correctly sorted and grouped during the first sorting level, then only a small number of pulses will undergo a second level of deinterleaving. However, invariably many input pulse signals are not capable of being correctly sorted because the signals can not be easily differentiated by the system. The sorting system is not able to recognize the input signals because the input signals are often noisy, inaccurate and corrupt with additional or missing signal parameter components or information. The pulse groups which were not correctly sorted and grouped by the system at the first level of analysis require a second level of analysis commonly referred to as "second level deinterleaving". This second processing and sorting level requires multiple and complex sorting algorithms which occupy a great deal of computer time. Once all of the input signals have been sorted and deinterleaved by the first and second levels of analysis, they are transferred to a third stage of processing commonly referred to as emitter identification. During this stage, the sorted groups are analyzed so that the radar emitter transmitting each type of signal can be identified for ESM and ECM purposes.

In the past, various rule-based techniques were developed for sorting digitized pulse signals. One of the earlier rule-based sorting systems is commonly referred to as the histogram method. The histogram method compares each input pulse parameter signal against a group of preset signal parameters. The comparison is performed to determine if the parameters of the input pulse parameter signal can be classified within the group of preset signal parameter values. However, the histogram method may not accurately sort the incoming signal when even one parameter of the input pulse parameter signal does not match the preset signal parameter values. This makes the histogram method undesirable. The histogram method is also undesirable because the incoming signals must be input to the system at a relatively slow rate as compared to the rate that the pulse signals are transmitted by the radar emitter. Therefore, a sorting system utilizing the histogram method is not readily able to produce a real time system response to incoming radar pulse signals.

Another early rule-based sorting technique is commonly referred to as "adaptive binning." Adaptive binning compares individual parameters of the input pulse signal to preset signal parameter values. Each input pulse signal can have numerous parameter values. The adaptive binning system is relatively slow in operating because only one parameter comparison is undertaken at a time. Therefore, successive comparisons are not made until preceding comparisons are complete.

Additionally, the adaptive binning system is very rigid, inflexible and incapable of sorting input signals having parameter value errors. For example, if an input pulse signal consists of ten parameters, and one parameter of the group of ten parameters is out of range because the signal is noisy and incapable of being properly read by the system, the input pulse signal would not be correctly sorted. This type of incorrect sorting can occur even if the remaining nine signal parameters match the corresponding preset signal parameter values exactly. Since the system is so inflexible and incapable of sorting inputs having only one corrupt input pulse parameter, optimal results for sorting real data only approach approximately 88% accuracy. The adaptive binning system is also undesirable because it can not easily provide a "joint" quality measurement of system performance and sorting accuracy.

It has been proposed by Donald F. Specht, in his article, "Probabilistic Neural Networks for Classification, Mapping, or Associative Memory", published in the Proceedings of the 1988 IEEE International Conference on Neural Networks, Vol. 1, pp. 525–32, July 1988, to use a probabilistic neural network (PNN) to recognize input signals based upon a priori test data. Specht proposed using a PNN to search incoming data signals for a priori data patterns. The a priori test data is essentially a library or directory of patterns representing a database for the system. The probabilistic neural network developed by Specht is a multi-layer feed-forward network which uses sums of Gaussian distributions to estimate a probability density function based upon a group of a priori training patterns. The estimated probability density function is then used to sort and match new input data to the a priori training patterns.

In another article, "The Use of Probabilistic Neural Networks to Improve Solution Times for Hull-To-Emitter Correlation Problems", published by the International Joint Conference on Neural Networks, Vol. 1, pp. 289–94, June 1989, P. Susie Maloney and Donald F. Specht disclose applying a probabilistic neural network to hull-to-emitter correlation problems for electronic intelligence (ELINT) systems. However, this process operates utilizing already sorted pulse data and does not use a probabilistic neural network for real time, non a priori pulse sorting. Real time, non a priori pulse sorting is difficult because real data input signals are often noisy, inaccurate, and corrupt with additional or missing signal parameter components and information. In addition, the output probability density function for a specific signal emitter may have multiple disjoint boundaries where an individual boundary may be overlapped with another emitter probability density function. Such input signal parameters cannot be accurately approximated by an n-dimensional Gaussian distribution as proposed by Specht.

Today, a great many automobiles are sold with elaborate safety systems that are designed to help the driver and passengers of the vehicle survive a collision. These safety systems often include seat-belts, air-bags, anti-lock brakes and side-impact restraint systems. The current vehicle safety systems (collision survival devices) are an improvement over automobiles that did not have such safety systems. In fact, safety systems are quickly becoming an important selling point for automobile manufacturers and salesman, and an important consideration for consumers when purchasing an automobile. As important as these safety systems have become, a reliable collision warning system which would obviate the need for collision survival devices is yet to be developed and marketed for consumer use.

Collision warning radar systems have only recently been tested and incorporated for use in motor vehicles. Studies have determined the benefit of including collision warning devices in motor vehicles stating that sixty percent of roadway collisions could be avoided if the operator of the vehicle was provided warning at least one-half second prior to a collision. Current collision warning systems operate by attempting to measure the relative position, speed and direction of objects to determine whether the objects being monitored are moving closer or farther away (i.e., presenting a greater or lesser threat of collision) from the motor vehicle. These systems are relatively unreliable and often reach alarm condition prematurely or at a time when the collision can not be avoided. In addition, current collision warning systems are incapable of reliably tracking a plurality of closely located objects (i.e., cars, highway dividers, trees, barriers, etc.) and are incapable of reliably determining if an object is presenting a greater or lesser danger for collision so as to provide adequate warning of a potential collision.

OBJECTS AND SUMMARY OF THE INVENTION

It is an object of the present invention to provide a system and method to sort unknown input object data signals of more than one object without the use of a priori training data.

It is yet a further object of the present invention to provide a collision avoidance and object detection signal identification sorting system and method which overcomes the inherent disadvantages of known collision avoidance and object detection sorting techniques.

In accordance with one form of the present invention, apparatus for motion detection and tracking of objects in a region for collision avoidance includes at least a signal transmitter, a signal receiver and a probabilistic neural network processor.

The signal transmitter includes an input port for receiving a first and second detection signal provided by a signal generator, and an output port for transmitting the first and second detection signals to a spatial region. Upon interaction with an object in the spatial region, the first and second detection signals are at least partially reflected by the object toward the signal receiver.

The signal receiver is electrically coupled to the signal transmitter and includes an input port and an output port. The input port of the signal receiver receives the at least partially reflected first and second detection signals which respectively correspond to first and second object parameter data signals. The first and second object parameter data signals are thereafter provided to the probabilistic neural network processor.

The probabilistic neural network processor is electrically coupled to the signal receiver so as to receive the first and second object parameter data signals. The probabilistic neural network provides an output signal indicative of the likelihood and threat of a collision with the object. The probabilistic neural network includes at least one cluster processor circuit, a decision logic circuit and a switching circuit.

The cluster processor circuit includes an input buffer memory circuit essentially consisting of a group of serially connected memory circuits (i.e., registers). Input parameter data signals which are provided to the neural network by the interferogram detector/converter are temporarily stored in the serially connected memory circuits of the input buffer memory circuit. The cluster processor circuit also includes a group of processing elements connected to the input buffer memory circuit, exponential function circuits coupled to corresponding processing elements and a summation circuit connected to each exponential function circuit. These components interact to generate a probability density function estimation value signal for the cluster processor circuit. The probability density function estimation value signal is generated by using both assigned input parameter data signals temporarily stored in the memory circuits and current unassigned input molecular parameter data signals. The probability density function estimation value signal of a cluster processor circuit represents the probability that the current unassigned input parameter data signal closely matches or belongs to the group of assigned input parameter data signals currently stored in the corresponding cluster processor circuit.

The decision logic circuit is coupled to the summation circuit of each cluster processor circuit. The decision logic circuit compares the output signal of each summation circuit to at least a first threshold value signal, and more preferably, also to a second threshold value signal. The output signal of each summation circuit corresponds to a probability density function estimation value of the cluster processor circuit. The decision logic circuit comparison is made to determine if the probability density function estimation value signal is at least equal to the first threshold value signal, at most equal to the second threshold value signal, or less than the first threshold value signal and greater than the second threshold value signal. The comparison in the decision logic circuit occurs simultaneously for all currently operating cluster processor circuits. The sorting process can be characterized as an internal competition among the currently operating cluster processor circuits to determine which currently operating cluster processor circuit has the greatest probability density function estimation value signal and which assigned input molecular parameter data signal stored in the respective cluster processor circuit best matches the current unassigned input molecular parameter data signal.

The decision logic circuit is coupled to the switching circuit. The decision logic circuit generates and provides a decision address signal to the switching circuit. The decision address signal corresponds to the cluster processor circuit currently storing assigned input parameter data signals that best match the current unassigned input parameter data signal (i.e., the cluster processor circuit having the highest probability density function estimation value signal). If the probability density function estimation value signal of all currently operating cluster processor circuits is less than the first threshold value signal and less than the second threshold value signal, then the decision logic circuit provides a decision address signal to the switching circuit instructing the switching circuit to activate a previously non-operating cluster processor circuit.

The switching circuit receives both the decision address signal and the current unassigned input parameter data signal being scrutinized. The switching circuit then provides the current unassigned input parameter data signal to the input buffer memory circuit of the cluster processor circuit corresponding to the decision address signal transmitted by the decision logic circuit. The newly assigned input parameter data signal is temporarily stored in the first register of the input buffer memory circuit of the corresponding cluster processor circuit. When the current input parameter data signal is sorted and stored in the input buffer memory circuit, the previously stored input molecular parameter data signals are sequentially transmitted to the next register in the group of serially connected registers for further storage. Therefore, upon introduction of the current input parameter data signal to the first register, the assigned input parameter data signal that was previously stored in the first register is shifted to the second register of the input buffer memory circuit. Furthermore, the input parameter data signal stored in the second register is shifted to the third register and so on. The input parameter data signal that was in the last register of the input buffer memory circuit is considered "outdated" and not valuable for determining the next probability density function estimation value signal. Accordingly, this "outdated" input parameter data signal is discarded and replaced by a subsequent input parameter data signal.

The switching circuit will activate a previously non-operating cluster processor circuit when the probability density function estimation value signal computed for all currently operating cluster processor circuits is less than the first and the second threshold value signals. For example, a probability density function estimation value signal of less than 10% for every currently operating cluster processor circuit indicates that the current unassigned input parameter data signal does not match the assigned input parameter data signals stored in the currently operating cluster processor circuits. Accordingly, a previously non-operating cluster processor circuit is activated to store the current unassigned input molecular parameter data signal. The new cluster processor circuit corresponds to a new sorting group. The newly assigned input molecular parameter data signal will be stored in the first register of the input buffer memory circuit of the newly activated cluster processor circuit.

A preferred form of the apparatus for motion detection of objects in a region for collision avoidance utilizing a real time adaptive probabilistic neural network system and method for data sorting and storing, as well as other embodiments, objects, features and advantages of this invention, will be apparent from the following detailed description of illustrative embodiments thereof, which is to be read in connection with the accompanying drawings.

DETAILED DESCRIPTION OF THE PREFERRED EMBODIMENTS

Figure 1:
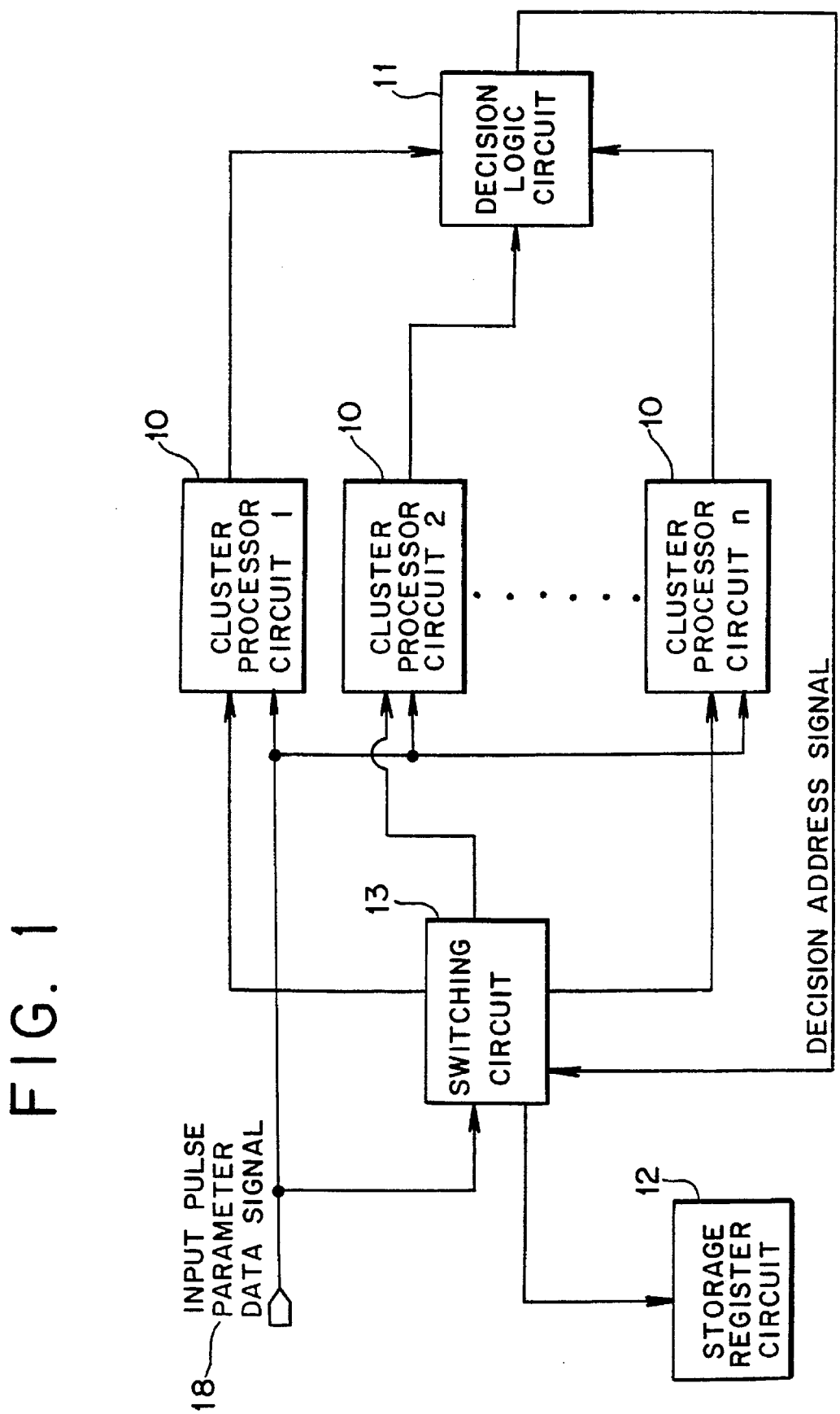
FIG. 1 is a block diagram of an adaptive probabilistic neural network system utilized in the present invention.

Referring now to FIG. 1 of the drawings, a preferred real time data sorting adaptive probabilistic neural network (APNN) constructed in accordance with the present invention will now be described. The APNN includes a plurality of identical subunits commonly referred to as cluster processor circuits 10. Each cluster processor circuit may be classified as a currently operating cluster processor circuit, a newly operating cluster processor circuit or a non-operating cluster processor circuit. Each cluster processor circuit is operatively coupled to a decision logic circuit 11 and to a switching circuit 13. Each currently operating cluster processor circuit generates and provides a probability density function estimation value signal to the decision logic circuit. The decision logic circuit is also coupled to the switching circuit. The decision logic circuit generates and provides a decision address signal to the switching circuit. The decision address signal identifies the cluster processor circuit which results in correct sorting and temporary storage of a current unassigned input pulse parameter data signal 18.

Figure 2:
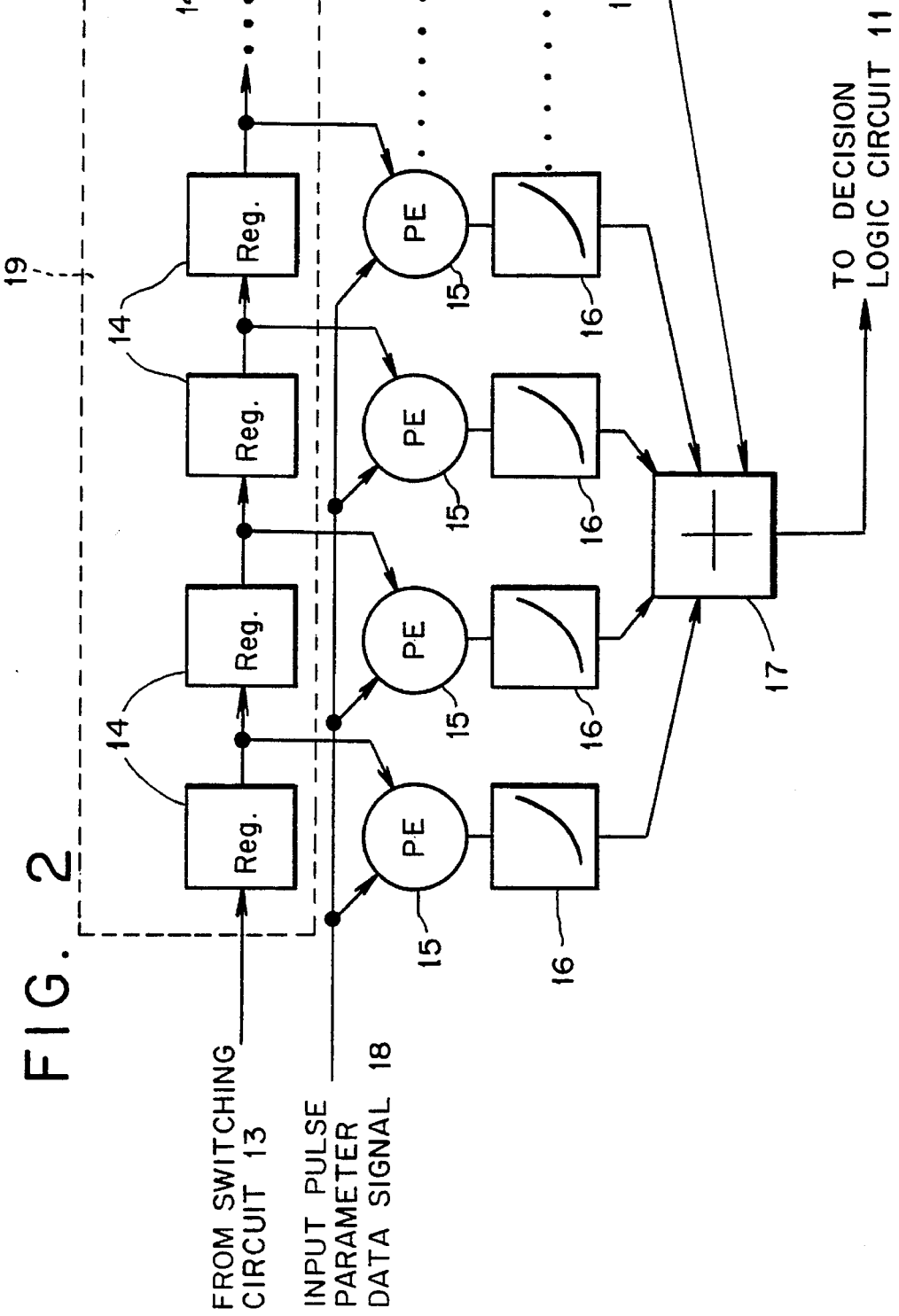
FIG. 2 is a block diagram of one cluster processor used in the neural network shown in FIG. 1.

A preferred form of the cluster processor circuit 10 is illustrated by FIG. 2. The cluster processor circuit includes a plurality of serially connected registers 14 (i.e., buffer memory circuits). The serially connected registers store the input pulse parameter data signal 18 assigned to the respective cluster processor circuit by the switching circuit 13. The combination of serially connected registers within the cluster processor circuit defines a pulse buffer memory circuit 19.

Each cluster processor circuit 10 also includes a plurality of processing elements 15. Each of the plurality of processing elements is coupled to a corresponding register 14 of the pulse buffer memory circuit 19. Each processing element receives assigned input pulse parameter data signals stored in a respective register of the pulse buffer memory circuit of the cluster processor circuit. Each processing element is also coupled to the system input which allows each processing element to receive the current unassigned input pulse parameter data signal 18. As described below, a processing element is designed to generate and transmit a signal to an exponential function circuit 16.

The cluster processor circuit 10 also includes a plurality of exponential function circuits 16. Each of the plurality of exponential function circuits is coupled to a corresponding processing element 15. Each exponential function circuit is configured to receive the output signal of only one of the plurality of processing elements. Each exponential function circuit performs an exponential function on the output signal of the processing element.

The cluster processor circuit 10 also includes a summation circuit 17. The summation circuit is coupled to each of the plurality of exponential function circuits 16 of the respective cluster processor circuit. The output signal of each exponential function circuit is received by the summation circuit. The summation circuit processes the exponential function circuit output signals of the corresponding cluster processor circuit. The output signal of the summation circuit also represents the output signal of the corresponding cluster processor circuit. The output signal of the cluster processor circuit corresponds to a probability density function estimation value of the cluster processor circuit. A probability density function estimation value is simultaneously calculated for all currently operating cluster processor circuits. A probability density function estimation value signal represents the probability that the current unassigned input pulse parameter data signal matches or belongs to the group of assigned input pulse parameter data signals currently stored in the registers 14 of the pulse buffer memory circuit 19 of the respective cluster processor circuit. The cluster processor circuits 10 of the neural network system may employ parallel processing using transputers. A suitable transputer which may be used is Part No. MTM-PC, which is a reconfigurable multi-transputer, manufactured by Inmos Corporation.

The decision logic circuit 11 is coupled to the summation circuit 17 of each cluster processor circuit 10. The decision logic circuit includes a plurality of comparators. The decision logic circuit is designed to compare the probability density function estimation value signal of each currently operating cluster processor circuit to at least a first threshold value signal. The comparison process occurs simultaneously for all currently operating cluster processor circuits. In response to this comparison, a decision address signal is generated and transmitted by the decision logic circuit to the switching circuit 13. The decision address signal represents the cluster processor circuit currently storing the assigned input pulse parameter data signals which best match the current unassigned input pulse parameter data signal. The decision address signal can correspond to any currently operating cluster processor circuit or it can activate a non-operating cluster processor circuit so that the pulse buffer memory circuit 19 of the newly operating cluster processor circuit will store the current input pulse parameter data signal.

The switching circuit 13 is operatively coupled to the decision logic circuit 11 and to the pulse buffer memory circuit 19 of each cluster processor circuit. The switching circuit also receives the current unassigned input pulse parameter data signal 18. Upon receiving the decision address signal from the decision logic circuit, the switching circuit transmits the current unassigned input pulse parameter data signal to the pulse buffer memory circuit 19 of the cluster processor circuit 10 corresponding to the decision address signal received.

A storage register circuit 12 is coupled to the switching circuit 13. The storage register circuit receives the current unassigned input pulse parameter data signal transferred by the switching circuit. The switching circuit transfers, to the storage register circuit, the input pulse parameter data signals which can not be properly sorted by the present sorting method. This assignment to the storage register circuit corresponds to a probability density function estimation value signal of the respective cluster processor circuit which is less than the first threshold value signal and greater than the second threshold value signal. The input pulse parameter data signal in the storage register is maintained for possible future analysis and processing. Therefore, the input pulse parameter data signal may be correctly sorted to one of the plurality of cluster processor circuits.

The operation of the real time adaptive probabilistic neural network (APNN) for data sorting, constructed in accordance with the present invention, will now be described. Initially, the registers 14 of the pulse buffer memory circuit 19 of each cluster processor circuit 10 are empty and contain no assigned input pulse parameter data signals. The APNN system is designed so that a priori training data does not have to be stored in the registers at the beginning of system operation in order to effectuate sorting. The APNN system operates to develop its own sorting groups as the current unassigned input pulse parameter data signals 18 are introduced to the system. The sorting groups are defined by an internal competition among cluster processor circuits 10. Each currently operating cluster processor circuit represents a different sorting group corresponding to a different type of input pulse parameter data signal received. If the calculated probability density function estimation value signal of each currently operating cluster processor is less than at least a first threshold value signal, then a match does not exist between the current unassigned input pulse parameter data signal and the assigned input pulse parameter data signal stored in each currently operating cluster processor circuit. Therefore, a previously non-operating cluster processor circuit will be activated to establish a newly operating cluster processor circuit for storing the current input pulse parameter data signal.

The input pulse parameter data signal 18 introduced to the APNN system can represent any collection of measured pulse data. In the preferred embodiment, the input pulse parameter data signal is represented by a series of pulse signal parameters X where

X=[FF, PA, PW, AOA]

and

FF=fine frequency
PA=pulse amplitude
PW=pulse width
AOA=angle of arrival

For certain ESM systems, the AOA measurements are expressed by relative phases between three antennas to a reference antenna which itself corresponds to a vector of three components where:

AOA=[coarse AOA, fine AOA, extra-fine AOA]

Initially, when the system is activated, only a first cluster processor circuit of the plurality of cluster processor circuits is "currently operating." All other cluster processor circuits within the APNN system are "non-operating." The APNN system is initialized by receiving and providing the first input pulse parameter data signal 18 into the currently operating first cluster processor circuit. As the first input pulse parameter data signal is introduced to the APNN system, it is provided to each processing element 15 of the currently operating first cluster processor circuit. A probability density function estimation value signal is then generated in the currently operating first cluster processor circuit by the combined effects of the processing elements, the exponential function circuits, and the summation circuit. The probability density function estimation value signal is outputted by the summation circuit of the currently operating first cluster processor circuit according to the first input pulse parameter data signal.

The probability density function estimation value signal is generated according to the formula:

$$Pr(X_i) = \frac{1}{M} \sum_{j=1}^{M} EXP\left[ -\frac{(X_j - W_{ij})^2}{SIGMA^2} \right]$$

where

PR=probability density function estimation value

X=the current input pulse parameter data

W=previous input pulse parameter which is currently stored in a register of the pulse buffer i=cluster processor number corresponding to the emitter group or bin number j=current input data pulse signal parameter being analyzed Sigma=smoothing factor which represents the standard deviation of the probability density function (a constant set by the system operator)

M=total number of parameters contained in the input data pulse (i.e., FF, PA, PW . . . )

EXP=the exponential function

The probability density function estimation value signal is generated by the currently operating first cluster processor circuit in the following manner. The current unassigned input pulse parameter data signal to be sorted is received and provided to each processing element 15 of the first cluster processor circuit. Each processing element determines a value for the expression:

$$\left[ -\frac{(X_j - W_{ij})^2}{SIGMA^2} \right]$$

The above expression correlates to subtracting each parameter of the assigned input pulse parameter data signals stored in the registers 14 of the pulse buffer memory circuit 19 from the current unassigned input pulse parameter data signal. Since the current unassigned input pulse parameter data signal is the first data signal provided to the APNN system, there are no signals stored in the serially connected registers of the pulse buffer memory circuit. To account for the lack of stored data in the pulse buffer memory circuit, logic zeros are transmitted from each serially connected register to each processing element so that a value for the above expression can be generated. The difference between the input pulse parameter data signals stored in the registers (here it is logic zero) and the current unassigned input pulse parameter data signal is then squared and divided by Sigma$^2$, where Sigma has a constant value. The resulting value is provided to the exponential function circuit 16. The exponential function circuit performs an exponential function and generates a signal which is provided to the summation circuit 17.

The summation circuit 17 adds all of the output signals of the exponential function circuits 16. The output signal of the summation circuit, which corresponds to the output signal of the cluster processor circuit 10, is a measure of the probability or likelihood that the current unassigned input pulse parameter data signal matches the assigned input pulse parameter data signal stored in the pulse buffer memory circuit of the respective cluster processor circuit. For example, a probability density function estimation value signal of 80% represents a high probability of correctly sorting the current unassigned input pulse parameter data signal if the current unassigned input pulse parameter data signal is stored in the respective cluster processor circuit. However, a probability density function estimation value signal of 10% represents a decisive mismatch for the current unassigned input pulse parameter data signal and the assigned input pulse parameter data signal stored in the respective cluster processor circuit.

The decision logic circuit 11 contains at least a first threshold value signal. The decision logic circuit receives and compares the probability density function estimation value signal of the currently operating first cluster processor circuit to at least the first threshold value signal. The decision logic circuit comparison determines whether the current unassigned input pulse parameter data signal should be stored in the currently operating first cluster processor circuit or whether a non-operating cluster processor circuit should be activated to store the current unassigned input pulse parameter data signal. A newly operating cluster processor circuit represents a new sorting classification of input pulse parameter data signals received. In the preferred embodiment, two threshold value signals are utilized. They are the 70% and 10% threshold value signals. If it is assumed that the probability density function estimation value signal for the currently operating first cluster processor circuit is at least equal to the 70% threshold value signal, then the current unassigned input pulse parameter data signal will be stored in the currently operating first cluster processor circuit. Therefore, after comparing the probability density function estimation value signal of the currently operating first cluster processor circuit with the 70% and 10% threshold value signals, the decision logic circuit will generate and provide a decision address signal to the switching circuit 13 corresponding to the currently operating first cluster processor circuit. The decision address signal directs the switching circuit to transmit the current unassigned input pulse parameter data signal to the first register of the pulse buffer memory circuit 19 for temporary storage.

If the probability density function estimation value of the currently operating first cluster processor circuit is at most equal to the 10% threshold value signal, then a decision address signal will be transmitted instructing the switching Circuit to activate a previously non-operating cluster processor circuit. The previously non-operating cluster processor circuit is now referred to as a newly operating cluster processor circuit. The switching circuit then transmits the current unassigned input pulse parameter data signal to the first register of the pulse buffer memory circuit of the newly operating cluster processor circuit for temporary storage. The activation of the newly operating cluster processor circuit corresponds to a new type of input pulse parameter data signal received by the APNN system.

If the probability density function estimation value signal generated by the currently operating first cluster processor circuit is greater than the 10% and less than the 70% threshold value signals, then a different decision address signal is transmitted by the decision logic circuit 11 to the switching circuit 13. This decision address signal instructs the switching circuit to assign the current unassigned input pulse parameter data signal to a storage register circuit 12 for temporary storage. The input pulse parameter data signal stored in the storage register circuit is saved so that the APNN system can analyze the stored input pulse parameter data signal in greater detail at a later time. The input pulse parameter data signal stored in the storage register circuit is not used in subsequent calculations of probability density function estimation value signals. If desired, this unassigned input pulse parameter data signal stored in the storage register circuit can undergo a second level of analysis called deinterleaving. After the data has been deinterleaved, it can be sorted and stored in any currently operating or newly operating cluster processor circuit.

Figure 3:
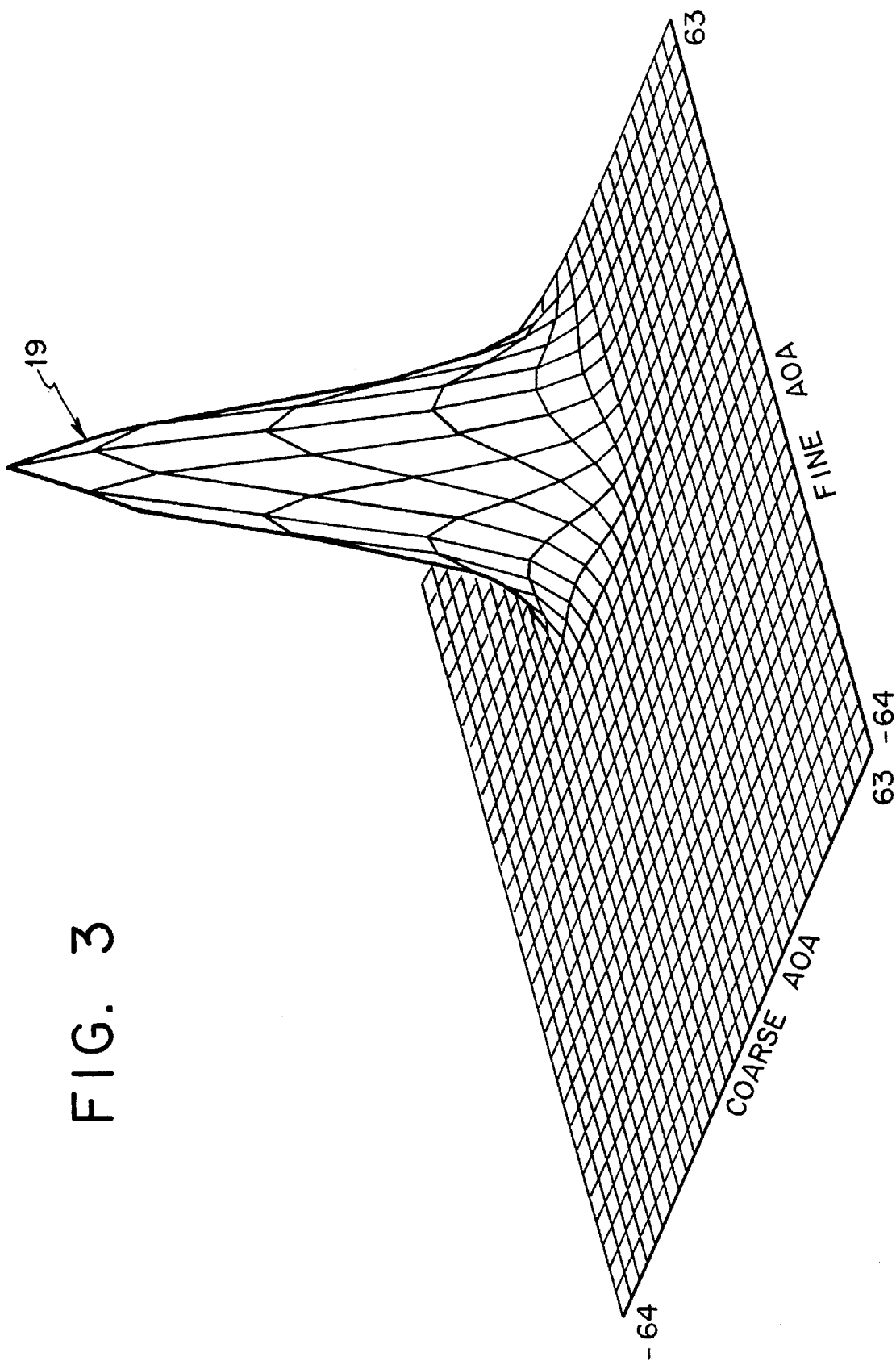
FIG. 3 is a graphical representation of a decision boundary of a 2-dimensional probabilistic neural network, after sorting one input parameter data signal.

The probability density function estimation value signal graph for the first cluster processor circuit containing the first input pulse parameter data signal is shown in FIG. 3. The probability density function estimation is shown by a two variable, two dimensional graph of, for example, coarse AOA vs fine AOA, as shown by reference numeral 19. Similar graphs can be made having different coordinate axes corresponding to the types of parameters which represent the input pulse parameter data signal. From FIG. 3, it is possible to measure statistical properties and to determine sorting performance in a quantitative manner.

Figure 4:
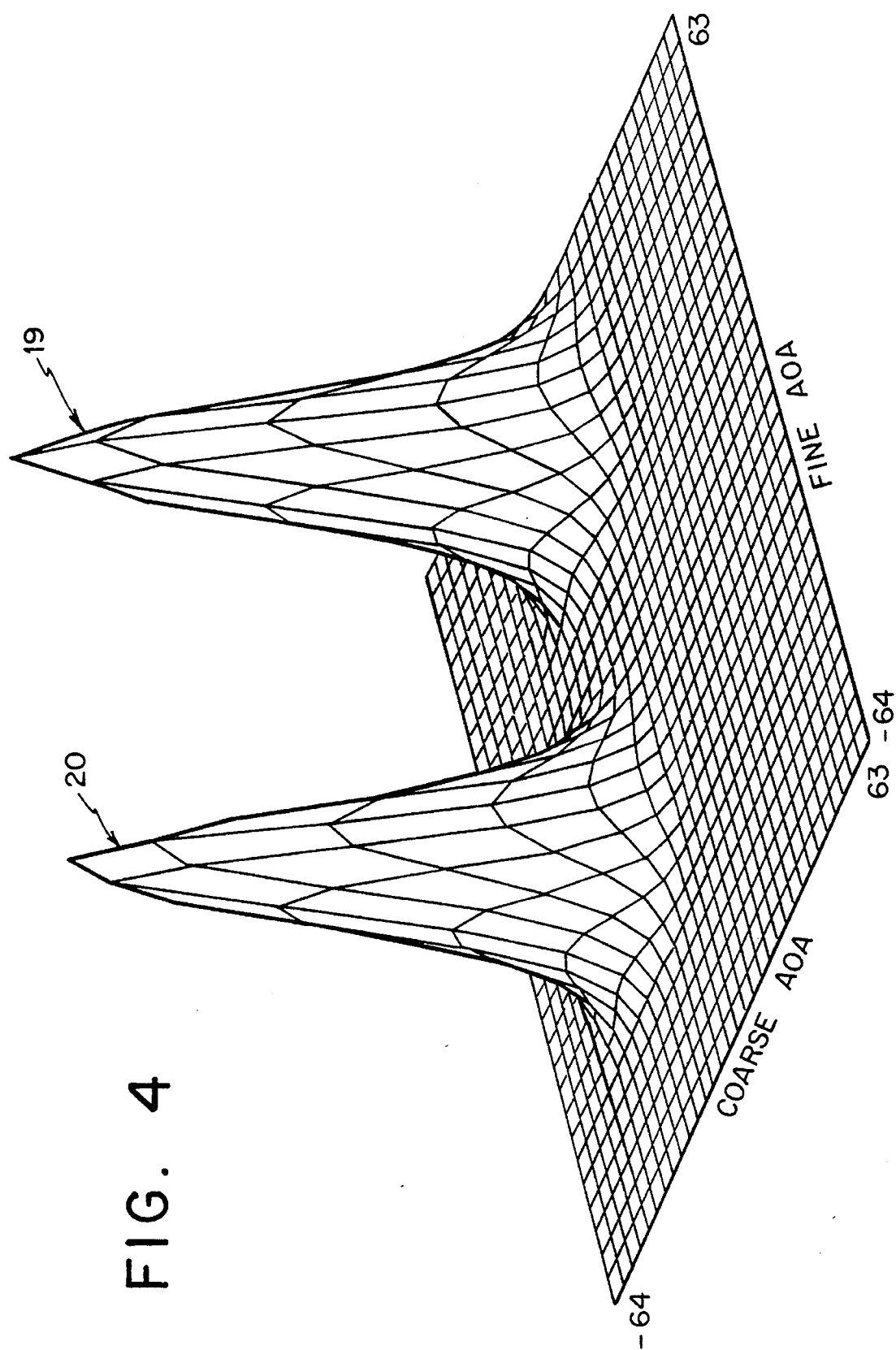
FIG. 4 is a graphical representation of a decision boundary of a 2-dimensional probabilistic neural network, after sorting two input parameter data signals.

As a second unassigned input pulse parameter data signal (Pulse No. 2) enters the system, initialization is not needed because the system has been operating. Therefore, the current unassigned input pulse parameter data signal (Pulse No. 2) is provided to each processing element of the first cluster processor circuit. The previous input pulse parameter data signal (Pulse No. 1), which is stored in the first register of the pulse buffer memory circuit 19 of the currently operating first cluster processor circuit, is provided to the first processing element along with Pulse No. 2. All other registers of the first cluster processor circuit which do not contain data signals provide a logic zero to corresponding processing elements. Each processing element generates and provides a signal to the corresponding exponential function circuit 16. The summation circuit 17 transmits the output signal of the cluster processor circuit to the decision logic circuit 11. The decision logic circuit performs a series of comparisons to see whether the probability density function estimation value signal of the first currently operating cluster processor circuit corresponding to Pulse No. 2 is at least equal to the 70% threshold value signal, at most equal to the 10% threshold value signal, or greater than the 10% and less than the 70% threshold value signal. If it is assumed that the current unassigned input pulse parameter data signal (Pulse No. 2) has less than a 10% probability density function estimation value as determined by the currently operating first cluster processor circuit, then the decision logic circuit provides a decision address signal to the switching circuit 13 to activate a previously non-operating cluster processor circuit. This newly operating cluster processor circuit corresponds to a new classification of input pulse parameter data signals. The switching circuit then transmits the current unassigned input pulse parameter data signal (Pulse No. 2) to the first register of the pulse buffer memory circuit of the newly operating second cluster processor circuit. The current unassigned input pulse parameter data signal (Pulse No. 2) is now referred to as an assigned input pulse parameter data signal. The probability density function estimation value signal graph showing the first and second currently operating cluster processor circuits and the corresponding assigned input pulse parameter data signals is shown by reference numerals 19 and 20 in FIG. 4.

As the next current unassigned input pulse parameter data signal (Pulse No. 3) is received and introduced to the adaptive probabilistic neural network, signal generation by the two currently operating cluster processor circuits is performed concurrently (i.e., in parallel). This is a clear benefit to using the neural network system over previous pulse sorting systems that operated by a rule-base method. The present APNN parallel processing system allows for numerous computations in a shorter time period.

Assuming that the two currently operating cluster processor circuits compute a probability density function estimation value signal using Pulse No. 3, both probability density function estimation value signals are transmitted by the summation circuit of each currently operating cluster processor circuit to the decision logic circuit 11. Once again, the previously stated 10%–70% threshold value signal comparison occurs. However, if both currently operating cluster processor circuits have a probability density function estimation value signal of greater than 70%, then the decision logic circuit will output a decision address signal corresponding to the currently operating cluster processor circuit having the larger probability density function estimation value signal. Assuming that the probability density function estimation value signal of the first currently operating cluster processor is larger than the probability density function estimation value signal of the second currently operating cluster processor, and further assuming that both estimation value signals are greater than the 70% threshold value signal, then the decision logic circuit will provide a decision address signal to the switching circuit corresponding to the currently operating first cluster processor circuit. Therefore, the switching circuit 13 assigns the current unassigned input pulse parameter data signal (Pulse No. 3) to the first register of the pulse buffer memory circuit 19 of the currently operating first cluster processor circuit. Accordingly, the previously assigned input pulse parameter data signal (Pulse No. 1) that was stored in the first register of the pulse buffer memory circuit of the currently operating first cluster processor circuit is shifted to the second register of the pulse buffer memory circuit. For each new input pulse parameter data signal that is introduced to the pulse buffer memory circuit of the currently operating first cluster processor circuit, the assigned input pulse parameter data signal is shifted to the next register until the assigned input pulse parameter data signal reaches the end of the pulse buffer memory circuit. When the assigned input pulse parameter data signal reaches the end of the pulse buffer memory circuit, it is discarded.

Figure 5:
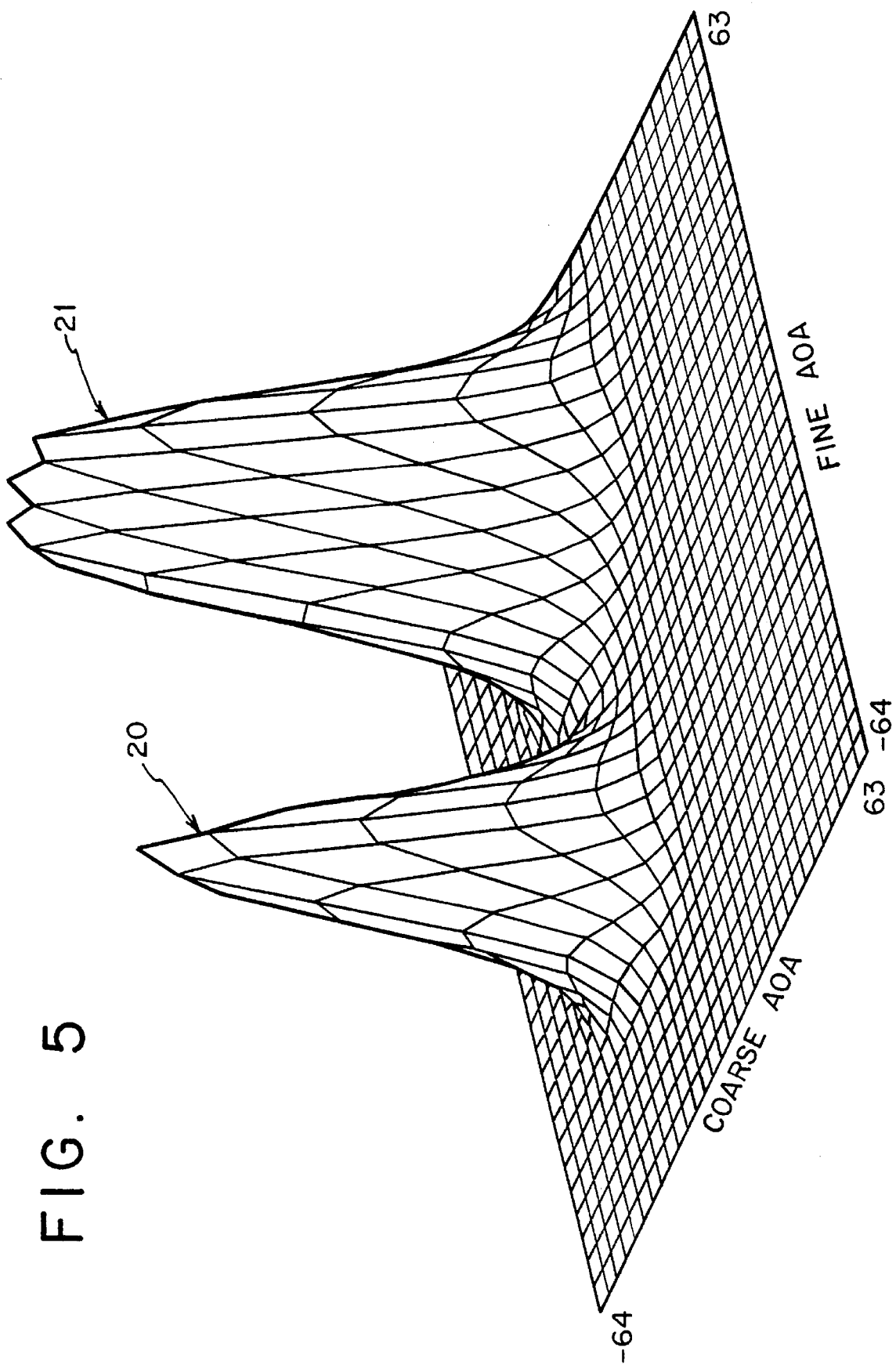
FIG. 5 is a graphical representation of a decision boundary of a 2-dimensional probabilistic neural network, after sorting three input parameter data signals.

FIG. 5 shows the probability density function estimation for the two currently operating cluster processors after the APNN system has received three input pulse parameter data signals. Reference numeral 21 represents the probability density function estimation value generated by the currently operating first cluster processor having two input pulse parameter data signals sorted therein.

The real time adaptive probabilistic neural network of the present invention is advantageously designed so that sorting of pulses at pulse arrival rates of over 10 million/sec can be achieved based on current VLSI technology. This is possible because the APNN system generates output signals using parallel processing. Previously used sorting methods generated output signals sequentially. The faster parallel processing enables the current APNN system to achieve a real time response.

Since the sorting process is based on a joint probability of the entire input pulse parameter data signal matching the input pulse parameter data signals previously sorted and stored in each cluster processor circuit, the system is capable of producing approximate results from noisy and incomplete data. This yields increased sorting accuracy as compared with previous sorting systems.

The adaptive probabilistic neural network of the present invention is also advantageously designed to provide a measure of the amount of error that will be tolerated by the system. This corresponds to the threshold value signals which are set by the system operator (i.e., 10% and 70% threshold value signals). The threshold value signals can be selected as desired.

Even though the above description of the real time data sorting adaptive probabilistic neural network specifically referred to "pulsed signals", the neural network system may also be applied to continuous wave (CW) signals which may then be sorted as previously described.

In addition to the above description of radar pulse sorting, a probabilistic neural network can also be specifically utilized for assisting in the detection, identification and tracking of objects proximate to a motor vehicle for collision warning and avoidance. Collision avoidance systems typically emit modulated, continuous radio waves at specific frequencies and measure the reflected received signal. The reflected signal of the radio waves are typically shifted in the frequency domain if the object is moving. Therefore, the faster the monitored object is traveling, the more the frequency of the reflected signal is shifted.

Figure 6:
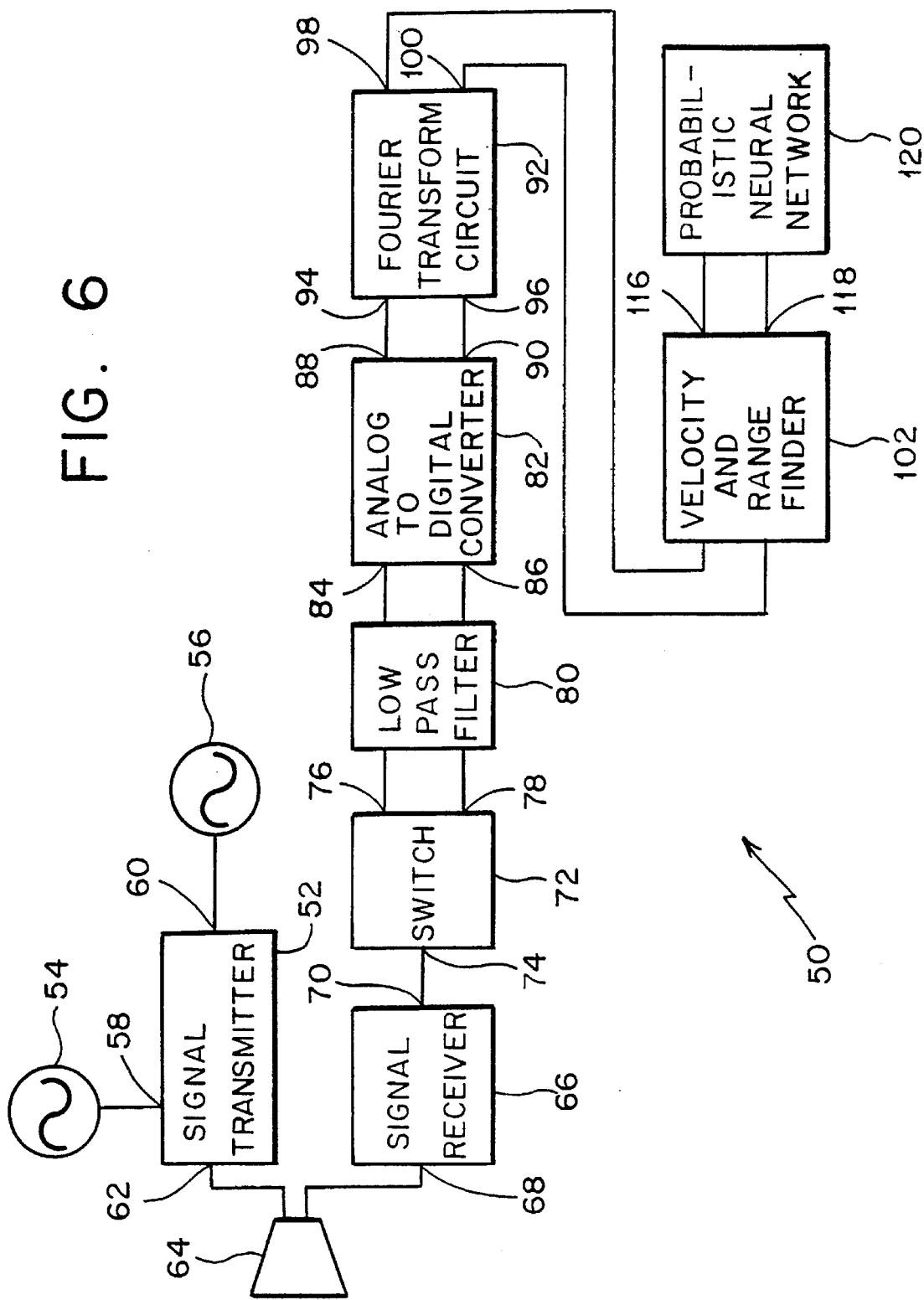
FIG. 6 is a block diagram of an apparatus for motion detection of objects in a region for collision avoidance in accordance with the present invention.

Referring now to FIG. 6 of the drawings, a preferred apparatus for motion detection of objects in a region for collision avoidance constructed in accordance with the present invention will now be described. The apparatus may be placed at a variety of locations on a motor vehicle such as the front, sides and rear of the vehicle to provide collision avoidance protection. The apparatus for detecting motion of objects 50 includes a signal transmitter 52, electrically coupled to first and second signal generators 54,56. The signal transmitter 52 preferably includes first and second input ports which receive first and second detection signals provided by first and second signal generators 54,56. In addition, the signal transmitter includes at least one output port 62. The first and second detection signals generated by the signal generators preferably have substantially distinct signal frequencies. In a preferred embodiment, the frequencies of the first and second detection signals are separated by approximately 250 kHz. The signal generators may preferably be Gunn oscillators or dielectric resonant oscillators such as Part No. DE2011 manufactured by GEC Plessy Semiconductors of the United Kingdom. The signal generators may also include an amplifier to increase the power of the first and second detection signals before transmission. Alternatively, the signal transmitter 52 may include an amplifier or, amplifiers may be coupled between the first signal generator 54 and the signal transmitter 52 or coupled between the second signal generator 56 and the signal transmitter 52. The signal transmitter 52 preferably provides the simultaneous transmission of the first and second detection signals.

The apparatus for collision avoidance 50 preferably includes an antenna 64 electrically coupled to the signal transmitter output port 62 for providing a radio frequency (rf) signal which includes the first and second detection signals generated by the first and second signal generators 54,56. Preferably, the (rf) signal provided by the antenna consists of distinct signal components including the first detection signal and is provided to a spatial region proximate to the antenna. The (rf) signal is specifically chosen so that the signal will at least partially reflect off of objects which encounter the signal after transmission by the antenna. In a preferred from of the present invention, the antenna is an etched phased array antenna such as Part No. DE2006 manufactured by GEC Plessy Semiconductors of the United Kingdom. Alternatively, Part No. DE2001 manufactured by GEC Plessy Semiconductors may be utilized wherein the signal transmitter and signal receivers are integral with the etched phased array antenna and oscillator circuits.

The collision avoidance apparatus 50 also preferably includes a signal receiver 66 having an input port 68 and an output port 70 wherein the input port is electrically coupled to the antenna 64. In a preferred embodiment and as shown in FIG. 6, the antenna is coupled to both the signal transmitter output port 62 and the signal receiver input port 68 so that the antenna both sends and receives the first and second detection signals. After the antenna transmits the first and second detection signals to the spatial region, the signals preferably reflect off objects located in the region and at least a portion of the signal is transmitted (i.e., reflected back) to the signal receiver. The antenna is designed to receive the reflected signal beam (including the first and second detection signals) which has been reflected by the object, and to provide the received signal to the signal receiver.

In a preferred embodiment of the present invention, the reflected first and second object parameter data signals, once received by the signal receiver 66 are provided on the signal receiver output port 70 to a switching device 72 which preferably separates the first and second object parameter data signals. A suitable switching device for separating the first and second object parameter data signals is Part No. LF13331 manufactured by National Semiconductor Corporation which is a JFET analog switch. The signal receiver 70 may also include an amplifier (not shown) for increasing the strength of the first and second object parameter data signals provided by the signal receiver 66 to the switch 72. Alternatively, a separate amplifier may be coupled between the signal receiver and the switch. The switching device 72 preferably includes an input port 74, for receiving first and second object parameter data signals from the signal receiver, and at least first and second output ports 76,78 for providing the first object parameter data signal on the first output port 76 and the second object parameter data signal on the second output port 78.

The first and second output ports of the switch are preferably electrically coupled to a low pass filter 80 for removal of noise and unwanted portions of the first and second object parameter data signals. In a preferred embodiment of the invention wherein the operating frequency of first and second object parameter data signals operate at approximately 24 GHz, the low pass filter is preferably approximately a 24 KHz filter. The filtered first and second object parameter data signals are preferably provided to an analog to digital (A/D) converter 82 which preferably has first and second input ports 84,86 and first and second output ports 88,90. Each of the first and second object parameter data signals are preferably converted from analog signals to digital signals in the A/D converter. A commercially available suitable part for the A/D converter is Part No. CS5339 manufactured by Crystal Semiconductor Corporation.

The A/D converter 82 provides a digital representation of the first and second object parameter data signals which are respectively provided on the first and second output ports 88,90 of the analog to digital converter. In an alternative embodiment of the invention, the collision avoidance apparatus 50 may also include a second low pass filter (not shown) for enhancement of the digital signal provided by the A/D converter. In this alternative form of the present invention, the second low pass filter is a 7.3 kHz filter for removing noise and unwanted signal components.

Figure 7:
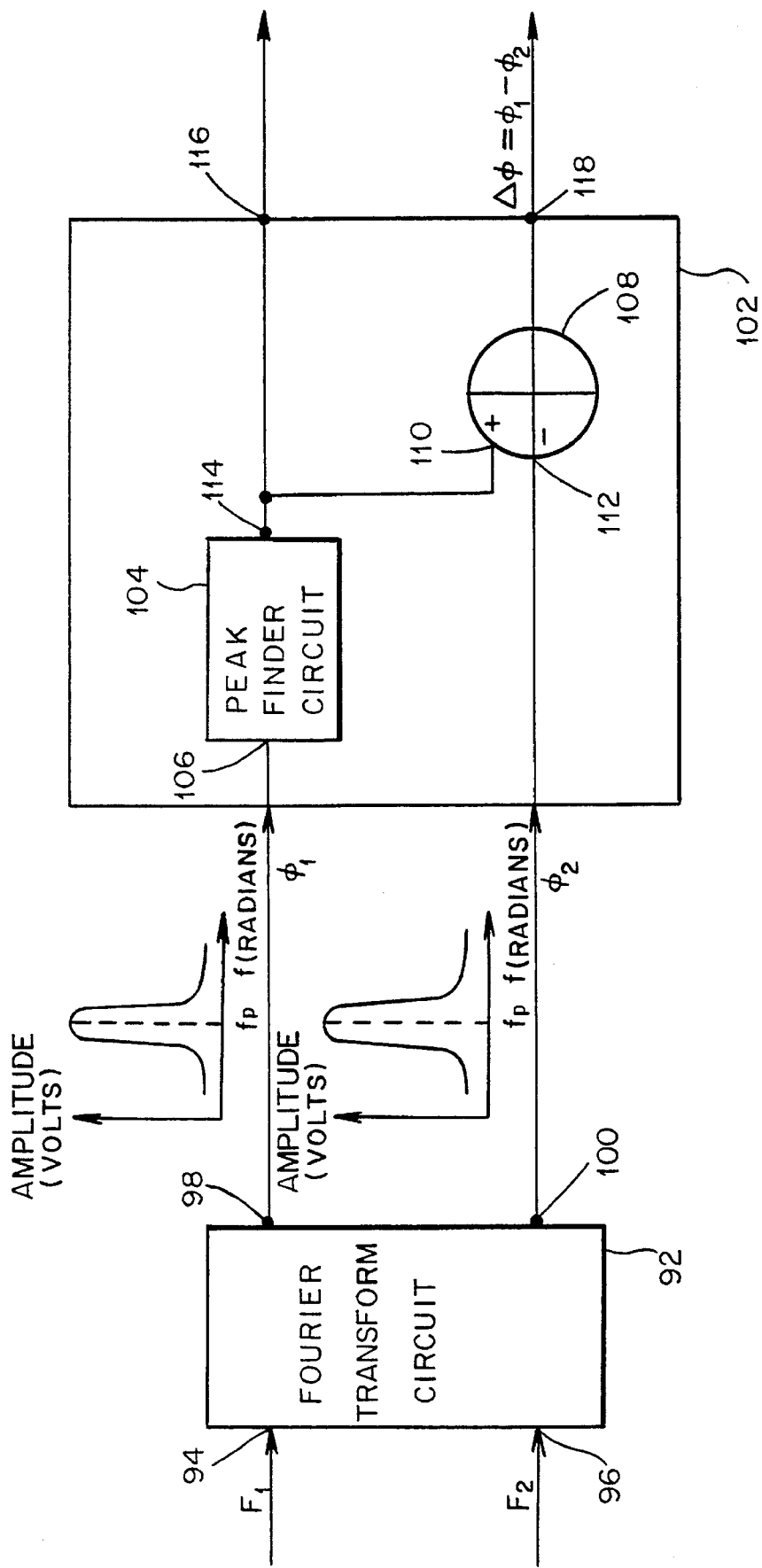
FIG. 7 is a block diagram of velocity and range finder circuit of FIG. 6 coupled to the Fourier transform circuit.

Referring now to FIGS. 6 and 7, the apparatus for motion detection and tracking of objects in a region for collision avoidance may further include a Fourier transform circuit 92 electrically coupled to the analog to digital converter 82. Preferably, the Fourier transform circuit 92 receives the digital first and second object parameter data signals (shown in FIG. 7 as $F_1$ and $F_2$) from the A/D converter at first and second Fourier transform input ports 94,96. The Fourier transform circuit converts the digital first and second object parameter data signals from a discrete time domain signal to a discrete frequency domain signal. The Fourier transform circuit 92 further includes first and second output ports 98,100 so as to provide first and second Fourier transform object parameter data signals, each representing a spectral waveshape of the digital first and second object parameter data signals. A suitable commercially available Fourier transform circuit is Part No. PDSP16510 manufactured by GEC Plessy Semiconductors of the United Kingdom.

As shown in FIG. 7, the first and second Fourier transform object parameter data signals provide a spectrum of the intensity of the reflected first and second detection signals at specific intervals. The output of the Fourier transform circuit is provided to a velocity and range finder circuit 102 shown in FIG. 6 and more specifically shown in FIG. 7. Preferably, the velocity and range finder circuit includes a peak finder circuit 104 having its input port 106 electrically coupled to the Fourier transform circuit first output port 98 for receiving the first Fourier transform object parameter data signal. The velocity and range finder also includes a subtractor circuit 108, having at least first and second input ports 110,112. The first input port 110 of the subtractor is preferably electrically coupled to the peak finder output port 114, and the second input port 112 of the subtractor is preferably electrically coupled to the second output port 100 of the Fourier transform circuit. A commercially available suitable peak finder is Part No. 74F524 manufactured by Signetics, a subsidiary of the Philips Corporation and a suitable subtractor is Part No. 74F283 also manufactured by Signetics.

Based upon the Fourier transform first object parameter data signal received from the Fourier transform circuit 92, the peak finder 104 provides an output signal indicative of the velocity of the monitored object. In contrast, the subtractor 108 receives both the Fourier transform first and second object parameter data signal and provides a subtractor output signal indicative of the difference between the first and second object parameter data signals which corresponds to the range (distance) of the monitored object from the apparatus.

The output ports 116,118 of the velocity and range finder 102 (the peak finder and subtractor) are preferably electrically coupled to a probabilistic neural network (PNN) processor 120 wherein each pulse buffer memory circuit of the PNN includes at least as many registers as the number objects being monitored by the motion detection and tracking apparatus for collision avoidance. The probabilistic neural network processor is preferably configured and operates as described with respect to FIGS. 1–5. Specifically, the probabilistic neural network receives the velocity and range finder output signal as inputs and, based upon previous velocity and range finder output signals, classifies a current velocity and range finder output signal utilizing a probability density function.

Figure 8:
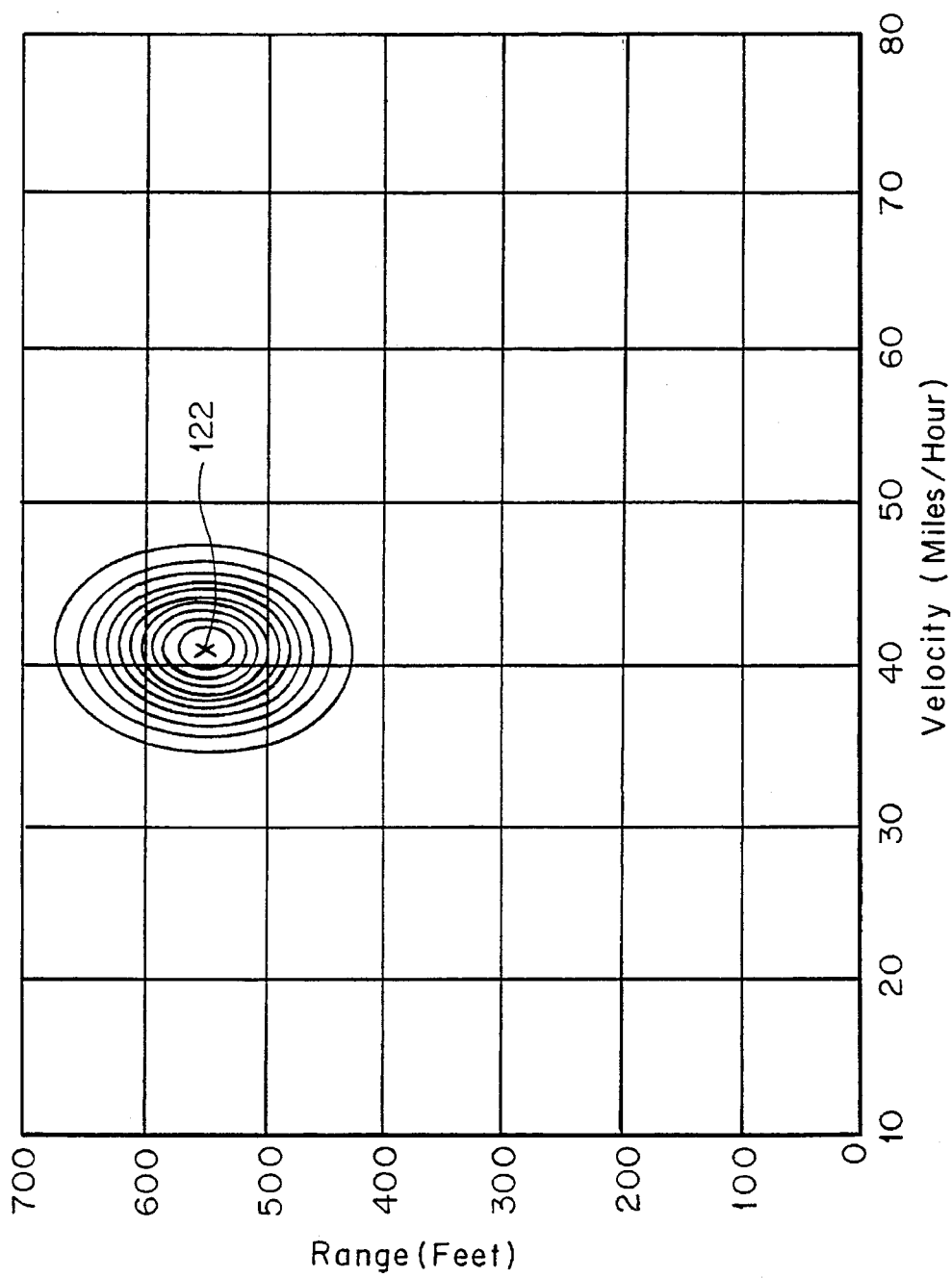
FIG. 8 is a graphical representation of a probability density function decision boundary after sorting a first input sample.
Figure 9:
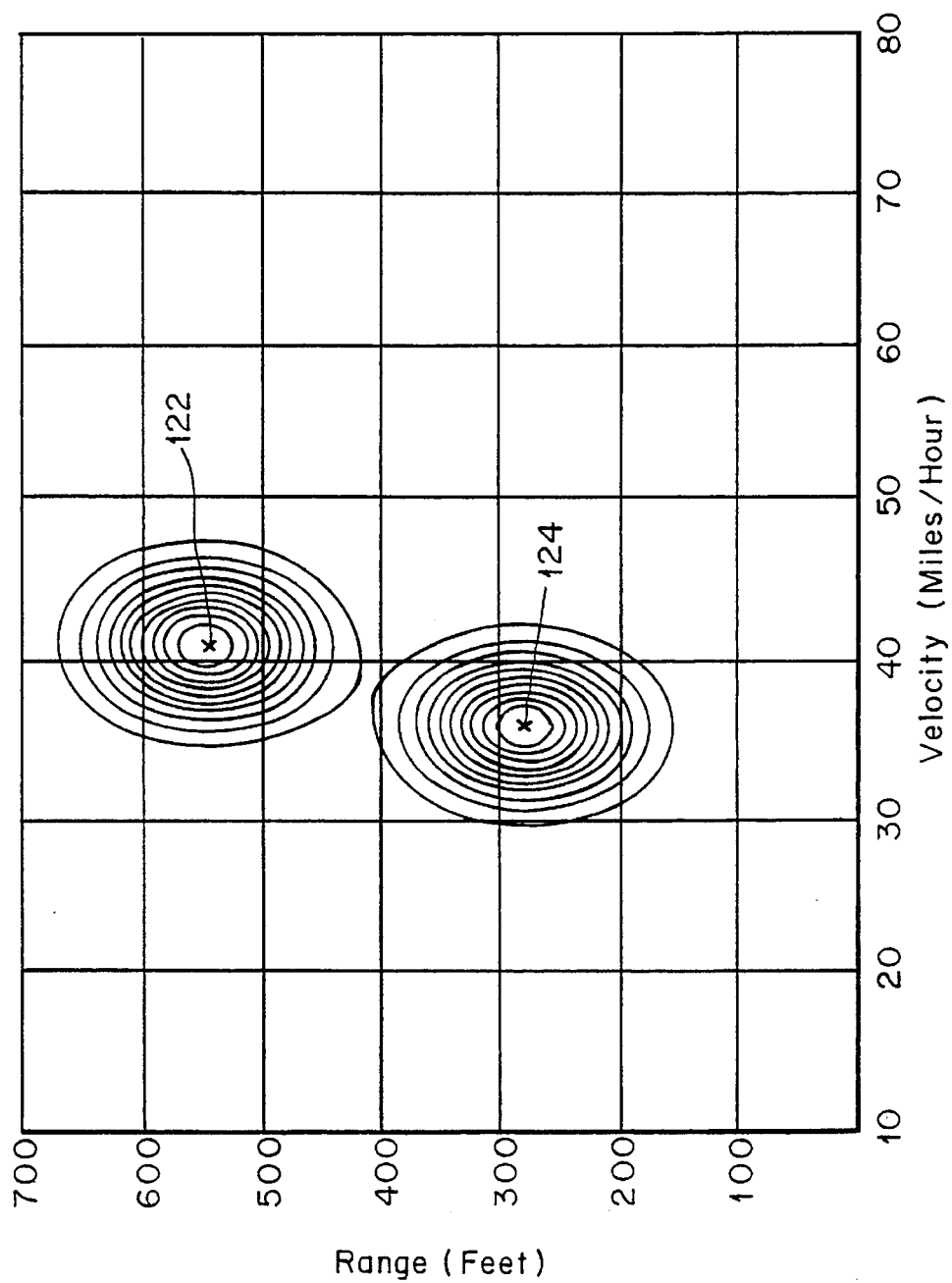
FIG. 9 is a graphical representation of a probability density function decision boundary after sorting first and second input samples.
Figure 10:
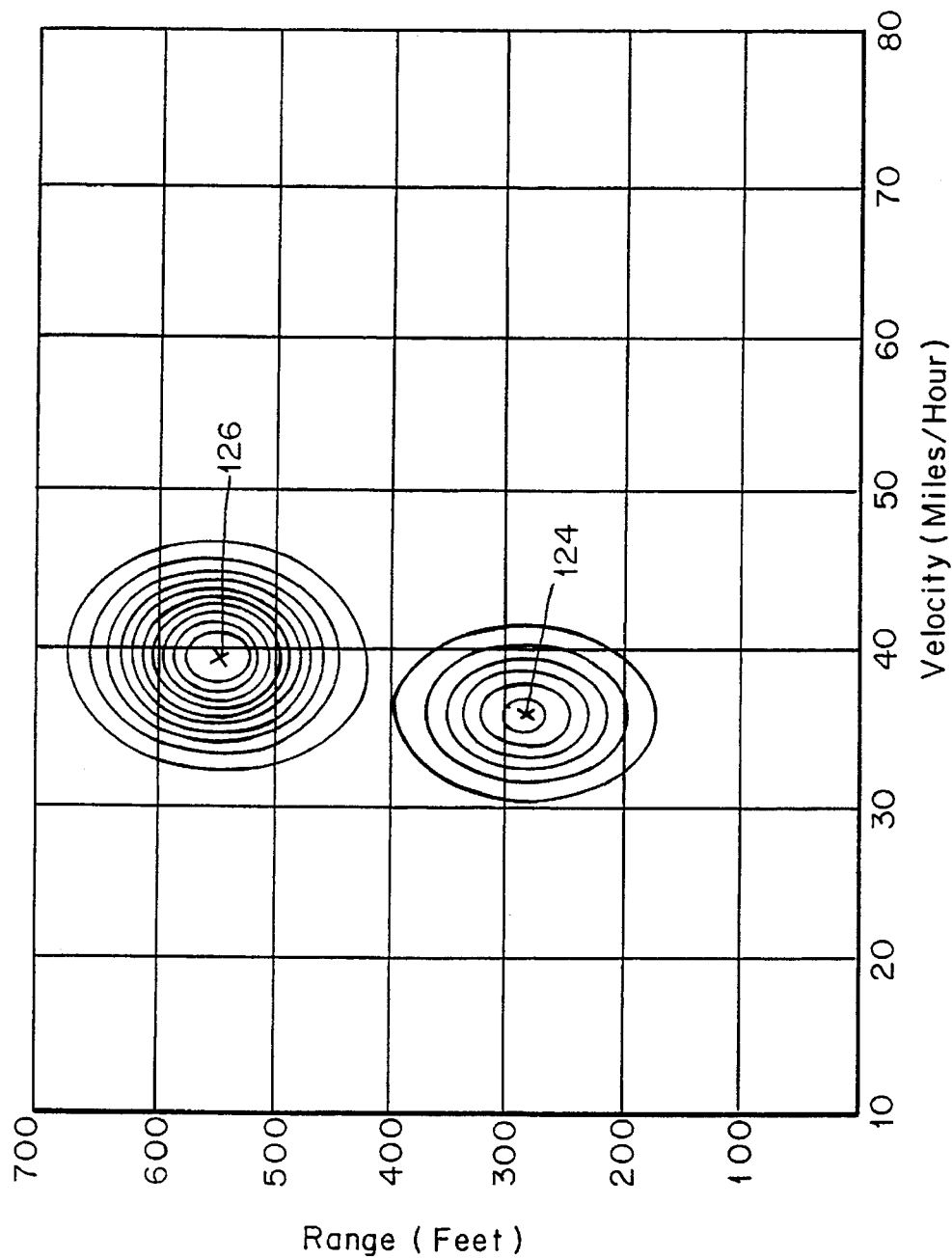
FIG. 10 is a graphical representation of a probability density function decision boundary after sorting first, second and third input samples.

FIG. 8 illustrates a first probability density function contour map (range of object vs. relative velocity) for a first data sample 122 processed by the apparatus. The concentric rings indicate various probabilities of matching wherein the inner most circle represents the highest probability of matching and the outermost circle represents the lowest probability of matching. FIG. 9 illustrates a second probability density function map showing the first sample 122 and a second sample 124. Since the second sample is not within the probability density function regions set around the first sample, probability density function regions are set around the second sample. For each successive sample point, either a new probability density function region is included or, if the current sample point falls within one of the currently existing probability density function contours, the current probability density function contours are recomputed to show a new likelihood of a future sample point matter such as shown in FIG. 10 wherein a third sample point 126 and the first sample point are combined to indicate the likelihood of the next position of the object being monitored.

The operation of the apparatus for motion detection and tracking of objects in a region for collision avoidance will now be described. First and second detection signals are preferably generated in the first and second signal generators 54,56 and provided to the signal transmitter 52 which may amplify and process the first and second detection signals before providing the signals to antenna 64 for transmission to a spatial region. The signal transmitter 52 preferably combines the first and second detection signals by modulation or multiplexing. Typically, the detection signal transmitted by the antenna has an azimuth field of view of approximately 4° and an elevation field of view of approximately 5°.

After transmission, the first and second detection signals, which as previously stated have substantially different frequencies, at least partially reflected off objects in the field of view. As a result, at least a portion of the signal reflects back to the antenna 64 which provides the received detection signals to a signal receiver 66. The signal receiver processes the received detection signals (i.e., including amplification) and provides the first and second detection signal to a switch 72. The switch 72 is preferably designed to separate the first detection signal from the second detection signal by switching.

Two switch output signals (i.e., first and second object parameter data signals), corresponding to the first and second detection signals, are provided by the switch to a low pass filter for removing noise and unwanted signal components. The low pass filter output signals are provided to an analog to digital converter which converts the continuous radio frequency signals to digital signals. The digital first and second A/D converter output signals are provided to a Fourier transform circuit which transforms a time domain signal (the received first and second detection signals corresponding to the first and second object parameter data signals) to a frequency domain signal. From the frequency domain signals, the velocity and range of the object being monitored are respectively determined by identifying the peak amplitude of one of the first and second object parameter data signals and by taking the difference between the first and second object parameter data signals. The output signal of the velocity and range finder is thereafter provided to the probabilistic neural network for determining whether a current data sample is properly associated with a prior data sample shown on a current probability density function contour map or whether the new data sample corresponds to a new object in the field of view of the antenna. By utilizing the probabilistic neural network, it is possible to associate current data samples corresponding to the present location of objects in the antenna field of view based upon previous locations of objects in the field of view. Therefore, it is possible to determine if an object is moving farther away and therefore the threat of collision is decreasing, or whether an object is moving closer and therefore a threat of collision is increasing.

Although an illustrative embodiment of the present invention has been described herein with reference to the accompanying drawings, it is to be understood that the invention is not limited to the precise embodiment, and that various other changes and modifications may be effected therein by one skilled in the art without departing from the scope or spirit of the invention.

We claim:

1. Apparatus for detecting and tracking motion of objects in a region for collision avoidance comprising:

a signal transmitter having an input port and an output port, the signal transmitter being responsive to first and second detection signals at the input port and transmitting the first and second detection signals from the output port to a spatial region, the first and second detection signals at least partially reflecting off at least one object located in the spatial region, the first detection signal having a first signal frequency and the second detection signal having a second signal frequency, the first signal frequency being substantially distinct from the second signal frequency, a signal receiver being electrically coupled to the transmitter, the receiver having an input port and an output port, the signal receiver being responsive to the at least partially reflected first and second detection signals respectively corresponding to first and second object parameter data signals, a probabilistic neural network processor being electrically coupled to the signal receiver and being responsive to the first and second object parameter data signals, the probabilistic neural network providing an output signal indicative of the proximity of an object detected in the spatial region; said probabilistic neural network including:

(a) a plurality of cluster processor circuits being responsive to the first and second object parameter data signals, each cluster processor circuit generating an output signal representing a probability density function estimation value corresponding to the received first and second object parameter data signals, each cluster processor circuit including:

(1) an input buffer memory circuit, the input buffer memory circuit having a plurality of serially connected registers for storing the first and second object parameter data signals assigned to a respective cluster processor circuit;

(2) a plurality of processing elements, each of the processing elements being coupled to a corresponding register of the input buffer memory circuit and being responsive to assigned first and second object parameter data signals stored in the input buffer memory circuit, each of the processing elements further being responsive to current unassigned first and second object parameter data signals, each processing element providing an output signal;

(3) a plurality of exponential function circuits, each of the exponential function circuits being coupled to a corresponding processing element, each exponential function circuit performing an exponential function on the output signal of each processing element and providing an output signal in response thereto; and (4) a summation circuit coupled to each of the exponential function circuits of the respective cluster processor circuit, the summation circuit being responsive to the output signals from the exponential function circuits, performing an addition function thereon and providing an output signal representing a probability density function estimation value for each unassigned first and second object parameter data signal;

(b) a decision logic circuit, the decision logic circuit being coupled to the summation circuit of each cluster processor circuit, the decision logic circuit comparing the output signal of each summation circuit of the corresponding cluster processor circuit with at least first and second threshold value signals, and providing a decision address signal in response thereto;

(c) a switching circuit, the switching circuit being coupled to the decision logic circuit and to each of the cluster processor circuits and further being responsive to current unassigned first and second object parameter data signals and assigning the current unassigned first and second object parameter data signals to a respective cluster processor circuit for storage in the input buffer memory circuit of the respective cluster processor circuit in response to the decision address signal from the decision logic circuit, the switching circuit being electrically coupled to the input buffer memory circuit of each cluster processor circuit, the switching circuit assigning the current unassigned first and second object parameter data signal to the input buffer memory circuit of a currently operating cluster processor circuit if the summation circuit output signal representing a probability density function estimation value of the currently operating cluster processor circuit is at least equal to the first threshold value signal, the switching circuit assigning the current unassigned first and second object parameter data signal to the input buffer memory circuit of a newly operating cluster processor which was previously a non-operating cluster processor if the summation circuit output signal representing the probability density function estimation value of each currently operating cluster processor circuit is less than or equal to the second threshold value signal; and (d) a storage register circuit, the storage register circuit being electrically coupled to the switching circuit, the switching circuit providing the current unassigned first and second object parameter data signals to the storage register circuit when the output signal of the summation circuit of each cluster processor circuit is less than the first threshold value signal and greater than the second threshold value signal, the unassigned first and second object parameter data signals being provided to the storage register circuit for later detailed analysis by the probabilistic neural network.

2. Apparatus as defined by claim 1, which further comprises:

a lowpass filter electrically coupled to the signal receiver, the lowpass filter substantially permitting passage of at least a portion of the first and second object parameter data signals less than a first frequency, the lowpass filter being responsive to the first and second object parameter data signals from the receiver and providing a lowpass filter output signal, the lowpass filter output signal being provided to the probabilistic neural network processor.

3. Apparatus as defined by claim 1, which further comprises:

an analog to digital converter, the analog to digital converter being electrically coupled to the signal receiver, the analog to digital converter being responsive to the first and second object parameter data signals and providing a plurality of digital first and second object parameter data signals, the plurality of digital first and second object parameter data signals being provided to the probabilistic neural network processor.

4. Apparatus as defined in claim 1, which further comprises:

a Fourier transform circuit being electrically coupled to the signal receiver, the Fourier transform circuit being responsive to the first and second object parameter data signals, the Fourier transform circuit providing a first and second Fourier transform object parameter data signals representing a spectral waveshape of the first object parameter data signal and the second object parameter data signal.

5. Apparatus as defined by claim 4, which further comprises:

a peak detector electrically coupled to the Fourier transform circuit, the peak detector receiving the first Fourier transform object parameter data signal, the peak detector providing a peak detector output signal indicative of the amplitude of the first object parameter data signal at a peak amplitude of the Fourier transform output parameter data signal, the peak detector output signal being provided to the probabilistic neural network processor, the peak detector output signal being indicative of a velocity of the object detected in the spatial region.

6. Apparatus as defined by claim 5, which further comprises:

a subtractor coupled to the Fourier transform circuit and the peak detector, the subtractor being responsive to the peak detector output signal and the second Fourier transform object parameter detector signal, the subtractor providing a subtractor output signal indicative of the difference between the peak detector output signal and the second Fourier transform output parameter data signal, the subtractor output signal representing a range of the object detected in the spatial region.

7. Apparatus as defined in claim 1, which further comprises:

a signal generator electrically coupled to the input port of the signal transmitter, the signal generator providing at least the first detection signal and the second detection signal to the signal transmitter for transmitting to the spatial region.

8. Apparatus as defined in claim 1, which further comprises:

an antenna electrically coupled to the signal transmitter output port and the signal receiver input port, the antenna being responsive to the first and second detection signals from the signal transmitter, the antenna transmitting the first and second detection signals to the spatial region, the antenna being responsive to the at least partially reflected first and second detection signals.

9. Apparatus as defined in claim 1, which further comprises:

switching means electrically coupled to the signal receiver output port for switching the first and second object parameter data signals, the switching means having an input port and at least first and second output ports, the switching means input port receiving both the first and second object parameter data signals, the switching means first output port providing the first object parameter data signal and the switching means second output port providing the second object parameter data signal.

10. Apparatus for detecting and tracking motion as defined by claim 1, wherein the first and second detection signals are continuous wave signals.

11. An apparatus as defined in claim 1, wherein said first threshold value signal is about 70% and said second threshold value signal is about 10%.

12. Apparatus for detecting and tracking motion of objects in a region for collision avoidance comprising:

a signal transmitter having an input port and an output port, the signal transmitter being responsive to first and second detection signals at the input port and transmitting the first and second detection signals from the output port to a spatial region, the first and second detection signals at least partially reflecting off at least one object located in the spatial region, the first detection signal having a first signal frequency and the second detection signal having a second signal frequency, the first signal frequency being substantially distinct from the second signal frequency, a signal receiver being electrically coupled to the transmitter, the receiver having an input port and an output port, the signal receiver being responsive to the at least partially reflected first and second detection signals respectively corresponding to first and second object parameter data signals, a Fourier transform circuit being electrically coupled to the signal receiver and being responsive to the first and second object parameter data signals, the Fourier transform circuit providing first and second Fourier transform object parameter data signals representing a spectral waveshape of the first object parameter data signal and the second object parameter data signal, and a probabilistic neural network processor being electrically coupled to the Fourier transform circuit and being responsive to the first and second object parameter data signals, the probabilistic neural network providing an output signal indicative of the proximity of an object detected in the spatial region, the probabilistic neural network comprising:

(a) a plurality of cluster processor circuits being responsive to the first and second Fourier transform object parameter data signals, each cluster processor circuit generating an output signal representing a probability density function estimation value corresponding to the received first and second Fourier transform object parameter data signals, each cluster processor circuit including:

(1) an input buffer memory circuit, the input buffer memory circuit having a plurality of serially connected registers for storing the first and second Fourier transform object parameter data signals assigned to a respective cluster processor circuit;

(2) a plurality of processing elements, each of the processing elements being coupled to a corresponding register of the input buffer memory circuit and being responsive to assigned first and second Fourier transform object parameter data signals stored in the input buffer memory circuit, each of the processing elements further receiving current unassigned first and second Fourier transform object parameter data signals, each processing element providing an output signal;

(3) a plurality of exponential function circuits, each of the exponential function circuits being coupled to a corresponding processing element, each exponential function circuit performing an exponential function on the output signal of each processing element and providing an output signal in response thereto; and (4) a summation circuit coupled to each of the exponential function circuits of the respective cluster processor circuit, the summation circuit being responsive to the output signals from the exponential function circuits, performing an addition function thereon and providing an output signal representing a probability density function estimation value for each unassigned first and second Fourier transform object parameter data signal;

(b) a decision logic circuit, the decision logic circuit being coupled to the summation circuit of each cluster processor circuit, the decision logic circuit comparing the output signal of each summation circuit of the corresponding cluster processor circuit with at least first and second threshold value signals, and providing a decision address signal in response thereto;

(c) a switching circuit, the switching circuit being coupled to the decision logic circuit and to each of the cluster processor circuits and further being responsive to current unassigned first and second Fourier transform object parameter data signals and assigning the current unassigned first and second Fourier transform object parameter data signals to a respective cluster processor circuit for storage in the input buffer memory circuit of the respective cluster processor circuit in response to the decision address signal from the decision logic circuit, the switching circuit being electrically coupled to the input buffer memory circuit of each cluster processor circuit, the switching circuit assigning the current unassigned first and second Fourier transform object parameter data signals to the input buffer memory circuit of a currently operating cluster processor circuit if the summation circuit output signal representing a probability density function estimation value of the currently operating cluster processor circuit is at least equal to the first threshold value signal, the switching circuit assigning the current unassigned first and second Fourier transform object parameter data signals to the input buffer memory circuit of a newly operating cluster processor which was previously a non-operating cluster processor if the summation circuit output signal representing the probability density function estimation value of each currently operating cluster processor circuit is less than or equal to the second threshold value signal; anal (d) a storage register circuit, the storage register circuit being electrically coupled to the switching circuit, the switching circuit providing the current unassigned first and second Fourier transform object parameter data signals to the storage register circuit when the output signal of the summation circuit of each cluster processor circuit is less than the first threshold value signal and greater than the second threshold value signal, the unassigned first and second Fourier transform object parameter data signals being provided to the storage register circuit for later detailed analysis by the probabilistic neural network.

13. Apparatus for detecting and tracking motion as defined by claim 12, wherein the first and second detection signals are continuous wave signals.

14. An apparatus as defined in claim 12, wherein said first threshold value signal is about 70% and said second threshold value signal is about 10%.

15. A method of detecting and tracking motion of objects in a region for collision avoidance which comprises:

a) transmitting first and second detection signals having distinct frequencies for at least partial reflection by at least one object in a spatial region, the first detection signal having a first signal frequency and the second detection signal having a second signal frequency, the first signal frequency being substantially distinct from the second signal frequency;

b) detecting the first and second detection signals at least partially reflected by the object, the first and second detection signals corresponding to first and second object parameter data signals;

c) providing the first and second object parameter data signals to a probabilistic neural network for sorting the first and second object parameter data signals without the use of a priori training data, step (c) including the additional sub-steps of:

i) inputting current unassigned first and second object parameter data signals into at least one of a plurality of processing elements contained within a plurality of currently operating cluster processor circuits;

ii) generating a first signal representing a probability density function estimation value in response to the first and second object parameter data signal of each currently operating cluster processor circuit of the plurality of cluster processors, the probability density function estimation value signal being generated using the current unassigned first and second object parameter data signals and using a plurality of assigned first and second object parameter data signals stored in an input buffer memory circuit of each currently operating cluster processor circuit;

iii) comparing the first signal representing the probability density function estimation value generated by each currently operating cluster processor circuit to at least first and second threshold value signals in a decision logic circuit;

iv) generating a decision address signal in response to the comparison of the first signal and the first and second threshold value signals, the decision address signal being provided to a switching circuit, the decision address signal denoting a currently operating cluster processor circuit when the first signal representing the probability density function estimation value is at least equal to the first threshold value signal, the decision address signal denoting and activating a non-operating cluster processor circuit when the first signal representing the probability density function estimation value is at most equal to the second threshold value signal;

v) assigning the current unassigned first and second object parameter data signal from the switching circuit to the cluster processor circuit corresponding to the decision address signal provided to the switching circuit;

vi) storing the current unassigned first and second object parameter data signal in the input buffer memory circuit of the cluster processor circuit according to the decision address signal received by the switching circuit; and vii) denoting a storage register circuit and assigning the current unassigned first and second object parameter data signal from the switching circuit to the storage register circuit for temporary storage therein when the first signal, representing the probability density function estimation value, is less than the first threshold value signal and greater than the second threshold value signal, the unassigned first and second object parameter data signal being provided to the storage register circuit for later detailed analysis by the probabilistic neural network.

16. A method as defined by claim 15, which includes the further step of manually setting the level of at least one of the first and second threshold value signals.

17. A method as defined by claim 15, wherein the first threshold value signal is greater in magnitude than the second threshold value signal.

18. A method as defined by claim 15, wherein prior to step (c), the method further includes Fourier transforming the first and second object parameter data signals to provide Fourier transformed first and second object parameter data signals.

19. A method of detecting and tracking motion as defined by claim 15, wherein the first and second detection signals are continuous wave signals.

20. A method as defined in claim 15, wherein in step (c)(iii), said first threshold value signal is about 70% and said second threshold value signal is about 10%.

* * * * *